March 5, 1940.  A. HERSHBERGER  2,192,708
LAMINATED MATERIAL
Filed Sept. 12, 1936
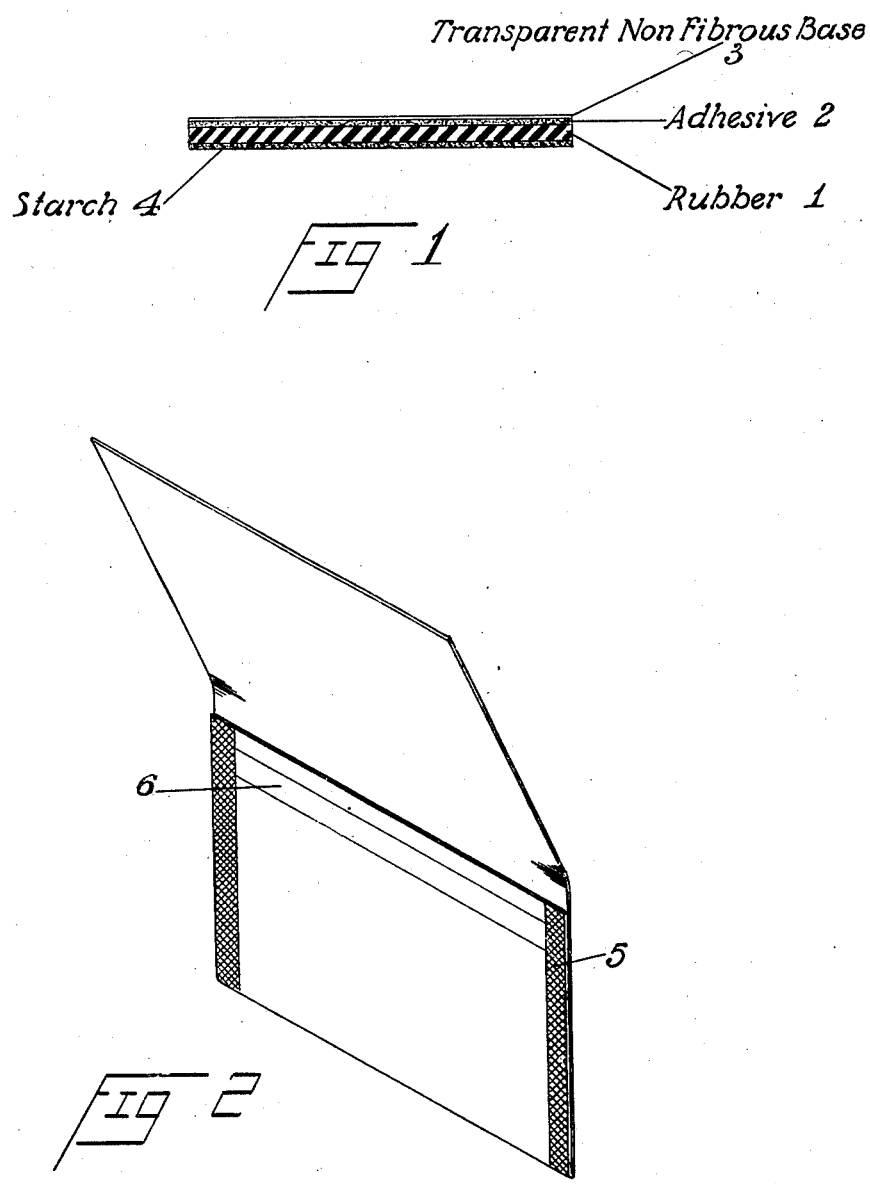
Albert Hershberger  INVENTOR.
BY Frank C Hilberg
ATTORNEY.

Patented Mar. 5, 1940

2,192,708

UNITED STATES PATENT OFFICE 2,192,708

LAMINATED MATERIAL

Albert Hershberger, Buffalo, N. Y., assignor to E. I. du Pont de Nemours & Company, Wilmington, Del., a corporation of Delaware Application September 12, 1936, Serial No. 100,403

6 Claims. (Cl. 154—43)

This invention relates to the preparation of laminated material and more particularly to the preparation of laminated material in which a flexible non-fibrous transparent film of cellulosic material is firmly united to a substantial layer of rubber composition, and the use of this material in the preparation of containers.

Heretofore, it has been common practice to unite cloth, paper, and similar fibrous materials to a layer of rubber, subsequently vulcanizing the material with the result that the two layers are inseparable. The preparation of laminated material of this type is commonly practiced and presents no serious problem since paper and cloth are porous and the raw rubber is easily forced into the interstices of the fabric so that the fibers are embedded in the rubber. Upon vulcanization, the components of the laminated material are integrally united.

With the widespread use of regenerated cellulose sheet material such as that sold under the trade-mark "Cellophane," and cast cellulose derivative films, it has been found desirable to laminate such films with rubber. However, due to the great difference in the physical and chemical properties of the two materials, no satisfactory method has heretofore been found for uniting such materials where the bond between the two has been at all substantial.

This invention has as an object the provision of a method of producing laminated material in which a dense, non-fibrous layer of cellulosic material is intimately joined to a substantial layer of uncured rubber composition as distinguished from a thin application of pure rubber cement.

Another object of this invention is the provision of laminated material in which a dense non-fibrous layer of cellulosic material is joined to a substantial layer of rubber by means of an intermediate adhesive film.

A still further object of this invention is the provision of a method of preparing a container from a laminated material having a layer of uncured rubber composition intimately joined to an ornamentally printed transparent cellulosic sheet.

These objects are accomplished by printing or otherwise applying a thin film of a suitable composition to a transparent sheet and subsequently applying thereto a layer of rubber composition.

In the drawing, Figure 1 represents a diagrammatic section through a portion of the laminated material, Figure 2 represents a pouch prepared from such material. In Figure 1, the rubber compostion is indicated as 1, the adhesive shown as 2, and the transparent non-fibrous base is indicated as 3. A surface layer of starch is shown as 4. In Figure 2, 5 represents an area which has been permanently sealed together by applying pressure to the designated area with a knurled rotating wheel or press (not shown). A temporary seal for keeping the contents of the container in an airtight condition may be obtained by applying pressure at any convenient zone such as that represented by 6.

In carrying out the invention, a flexible film such as regenerated cellulose is printed with an ink over substantially its entire area and when the ink is dry, a layer of uncured rubber composition is calendered onto the sheet in contact with the ink.

While regenerated cellulose either plain or moisture-proof is preferred as the transparent sheet material, other transparent films such as those prepared from rubber derivatives such as chlorinated, polymerized, or hydrogenated rubber, or rubber hydrochloride may be used. Cellulose derivative films such as cellulose nitrate, cellulose acetate, or cellulose ethers such as ethyl cellulose, and benzyl cellulose may also be used. It has also been found that suitable films may be prepared from cellulose derivatives cast from aqueous or alcohol dispersions such as glycol cellulose, cellulose glycolic acid and lower etherified or esterified celluloses. In fact, the invention relates to the use of practically any transparent film which retains its transparency and flexibility and is resistant to abrasion for an extended period of time.

The ink mentioned above may be either of the oil varnish type or of the nitrocellulose type to which in either case has been added an agent which enhances the permanency of the resulting bond between the transparent film and the subsequently applied layer of rubber.

The following two compositions illustrate typical oil varnish type inks which may be used as a base to which the adhesion enhancing agent is added:

Example 1

| | Per cent |
|---|---|
| Wachtung red lake | 39.63 |
| Litho transparent #1 linseed oil varnish | 59.50 |
| Cobalt lineolate paste (5.6% cobalt) | 0.87 |
| | 100.00 |

The following example illustrates a conventional type oil-varnish ink modified with ester gum:

Example 2

| | Per cent |
|---|---|
| Wachtung red lake | 35.67 |
| Litho transparent #1 linseed oil varnish | 53.40 |
| Cobalt lineolate paste (5.6% cobalt) | 0.78 |
| Ester gum | 10.15 |
| | 100.00 |

The invention is not lmited to the specific oil varnish inks given above since these compositions may be varied greatly both with respect to amounts and ingredients. It has been found however that if about 10% of the following materials are incorporated into the ink, the adhesion between the laminations is greatly improved.

These materials are as follows:

| | |
|---|---|
| Resin "A" | Abietyl abietate |
| Resin "B" | Rosin |
| Resin "C" | Aroclor 1268 |
| Balata resin | Amberol BS–1 |
| Benzyl abietate | Ar–46 |
| Gum damar | Cumar P–25 |
| Ester gum | Cumar V |
| Rosin oil | Neville resin 4 |

Resin "A" is a rosin hydrogenated castor oil modified alkyd resin.

Resin "B" has the following formula:

| | Parts |
|---|---|
| Petrex | 41.1 |
| Glycerine | 15.7 |
| Abietic acid | 50.0 |

These ingredients are placed in an aluminum kettle fitted with a stirrer and cooked until an acid number of 53.2 is obtained. The Petrex used in this formula is a maleic anhydride-alphaterpinene condensation product prepared according to U. S. Patent No. 1,993,025.

Resin "C" has the following formula:

| | Parts |
|---|---|
| Petrex | 17.0 |
| Glycerine | 11.0 |
| Rosin | 75.0 |
| | 103.0 |

These ingredients are placed in a kettle as above and cooked until an acid number of approximately 26.0 is obtained. The Petrex used in this example is the same as that used in the preparation of resin "B". This consists briefly of heating a slight excess of alphaterpinene (480 grams) with maleic anhydride (about 294 grams) or with an equivalent quantity of maleic acid at a temperature to cause gentle boiling for a period of about 5 hours.

Aroclor 1268 is prepared by chlorinating diphenyl until a non-crystalline mixture of isomers of the required viscosity is obtained.

Amberol BS–1 is an ester gum modified phenol-formaldehyde resin prepared by reacting rosin, glycerine, phenol and formaldehyde together. It has a melting point between 99 and 110° C. and is commonly used for making varnishes.

Ar–46 is a phenol-formaldehyde-methylamine resin and may be prepared by heating one mol of phenol with one mol of dimethylol methylamine until the temperature increases to 100° C. and the mass can no longer be stirred. When allowed to cool, it becomes hard and brittle and is then pulverized, washed, and dried.

Cumar P–25 is a coumarone-indene resin of the plastic type. It may be prepared by distilling coal tar and collecting the coumarone fraction which comes over between 160 and 180° C. which is then treated with sulphuric acid. The final product is a viscous semi-solid having a melting point of about 20 to 30° C.

Cumar V is also a coumarone-indene resin prepared in a manner similar to Cumar P–25. It differs from this resin in that it is of the varnish type and has a melting point between about 127 and 142° C.

Neville resin 4 is similar to Cumar V.

I prefer to refer to the above compounds as adhesion-enhancing agents and in the claims this term is intended to cover the above resins and their equivalents which when added to inks of the class herein described or otherwise used in combination therewith promote the adhesion between the non-fibrous base and the rubber layer over that obtained by using the ink alone.

The above illustrates how the invention may be carried out with modified oil varnish inks. It has also been found that the alkyd resin inks disclosed in application No. 609,977 in the name of McBurney and Nollau, filed May 5, 1932, now Patent No. 2,049,507, are satisfactory. The following formulas illustrate typical nitrocellulose inks to which the above adhesion-enhancing agents may be added:

Example 3

| | Percent |
|---|---|
| Nitrocellulose (¾ sec.) | 10.6 |
| Pigment | 6.7 |
| Tricresyl phosphate | 5.0 |
| Castor oil | 9.8 |
| Ethyl alcohol | 20.4 |
| Fusel oil | 2.7 |
| Toluene | 27.1 |
| Isopropyl acetate | 22.7 |

Example 4

| | Percent |
|---|---|
| Nitrocellulose (¾ sec.) | 11.3 |
| Pigment | 7.9 |
| Castor oil | 2.0 |
| Dibutyl phthalate | 6.3 |
| Ethyl alcohol | 18.3 |
| Ethyl acetate | 4.4 |
| Isopropyl acetate | 18.8 |
| Fusel oil | 2.2 |
| Toluene | 28.3 |

Example 5

| | Percent |
|---|---|
| Nitrocellulose (¾ sec.) | 9.7 |
| Pigment | 24.4 |
| Damar | 4.5 |
| Castor oil | 3.5 |
| Dibutyl phthalate | 3.5 |
| Ethyl alcohol | 10.0 |
| Ethyl acetate | 7.0 |
| Isopropyl acetate | 12.6 |
| Fusel oil | 1.6 |
| Toluene | 23.6 |

The above inks are compounded in any manner known to those skilled in the art and the resulting composition is applied to the transparent base either by printing, roller coating, spraying, or by any other suitable method.

It has also been found that instead of incorporating the adhesion enhancing agents mentioned above in the inks, they may be applied over the ink as a separate wash or directly to the non-fibrous base without any ink coat. An adhesive which has been found particularly satisfactory for this purpose is as follows:

*Example 6*

| | Percent |
|---|---|
| Rosin | 16.0 |
| Stearic acid | 4.0 |
| Carbon tetrachloride | 40.0 |
| Ethyl acetate | 40.0 |

Other solvents may be used in preparing this adhesive composition. For example, benzene or toluene may be used in place of carbon tetrachloride. Likewise, acetone, butyl acetate, or other esters or solvents which have a swelling effect on the nitrocellulose ink may be used.

After the nitrocellulose ink or the oil varnish ink containing the adhesion enhancing agent, with or without the adhesive coat, has been applied to the transparent sheet and allowed to dry, a substantial coat of uncured rubber composition is calendered onto the sheet. The rubber composition is preferably prepared according to the method disclosed in the application of Shaw and Moriarty, Serial No. 724,724 filed May 9, 1934, now Patent No. 2,046,975. The following example illustrates a satisfactory composition:

| | | |
|---|---|---|
| Pale crepe | pounds | 38 |
| Whiting | do | 20 |
| Barytes | do | 42 |
| Zinc oxide | do | 5 |
| Montan wax | do | 2 |
| Rubber oil | do | 2 |
| Stearic acid | ounces | 6 |

This compound may be modified in various ways that will be apparent to those skilled in the art as by adding coloring matter or essences, or in the use of other waxes and other types of rubber such as balata or synthetic rubber substitutes, for example, that known as neoprene. Satisfactory results have been obtained by applying the above composition to the extent of about 6 oz. per sq. yd.

After the laminated material leaves the calender rolls, it is subjected to a starching and brushing operation. The application of starch may be done by the use of a starching box such as those well known in the art or by any other means which will deposit a thin film of starch whether done by machinery or by hand. After the starching has been applied and the excess removed, the fabric is wound onto a roll in which condition it may be stored until ready for use.

The purpose of the starch is to form a non-sticky surface on the rubber side of the material. The rubber composition and the amount of starch applied are regulated so that subsequently after two pieces of the laminated material are brought together in such a way that the rubber surfaces are next to each other and pressure is applied along a narrow area the starch film will be broken and a temporary seal will be formed. This seal may be made and broken a great many times, and this property of the material makes it particularly valuable for the preparation of containers where it is essential to keep the contents in an airtight condition such as in tobacco pouches.

In the preparation of tobacco containers, the material is unrolled and cut into sections of suitable size depending upon the dimensions and shape of the finished container. The material is then folded as shown in Figure 2 and sufficient pressure is applied along the edges 5 or any other area where desired to break the starch film so that the two rubber surfaces along the area at which pressure is applied are practically permanently joined. It has been found convenient to join these edges by means of a rotating knurled wheel. The pressure applied at these areas is much greater than that applied to form a temporary seal.

In the practice of the invention, no limitation is placed upon the ink used to decorate the transparent film aside from the requirement that it adhere tenaciously to the film selected. However, as indicated above, one embodiment of the invention resides in the use of an ink which contains a resin or gum.

As indicated above, the ingredients in the rubber composition may be varied to some extent without departing from the spirit of the invention provided the property of forming a temporary seal is not destroyed. While a useful product may be obtained if the rubber is vulcanized and subsequently joined to the transparent film the resulting material could not be temporarily sealed in the manner described above. For this reason, it is preferred to use unvulcanized rubber.

It will be noted that a considerable percentage of filler appears in the formula for the rubber composition. This keeps the finished material adhesive under a great variety of conditions of humidity and temperature whereas if little or no filler were added, the rubber would too readily tend to form a permanent seal. In the claims by the term "filled" I mean that the rubber composition so described contains sufficient filler to prevent the composition from forming more than a temporary bond under moderate pressure so that the composition is tacky but not soft and sticky and this tackiness is overcome by a thin surface film of starch.

In describing the laminated material herein disclosed the word "substantial" is intended to mean a layer of rubber composition sufficiently thick so that when a surface layer of starch is applied it will still have enough body to form a temporary seal. I do not intend to cover a layer of rubber composition so thin that the starch layer represents enough of the film to render it non-tacky. It has been found that ordinarily the thinnest practical layer is about 0.003 of an inch. The rubber layer may be as thick as desired however I prefer at present to apply layers between 0.003 and 0.012 inch thick since if the layer is thicker than 0.012 inch the cost and weight of the laminated material is greatly increased. The preferred thickness is about 0.006.

While my preferred method of operation involves printing or coating the transparent sheet on the side in contact with the rubber, I may apply a clear coat on this side and print a legend or design on the opposite side with any suitable ink either before or after the rubber composition is applied to the base sheet.

Materials produced according to the present invention present an appearance of striking beauty and have the further advantage that they may be prepared at comparatively low cost. In fact, the cost is low enough so that they may be used as the original containers in the retail sale of tobacco and may be discarded when the tobacco is used up and still represent a saving over tin cans.

As many apparently widely different embodiments of this invention may be made without departing from the spirit and scope thereof, it is to be understood that the invention is not limited

I claim:

1. A laminated sheet material comprising a dense, non-fibrous, transparent, flexible base securely joined to a substantial layer of a filled, uncured rubber composition by means of an intermediate film of an alkyd resin containing rosin, said rubber composition being rendered non-tacky by means of a surface coat of starch.

2. Product of claim 1 in which the resin is a hydrogenated castor oil modified alkyd resin containing rosin.

3. Product of claim 1 in which the alkyd resin is the reaction product of the following ingredients:

| | Parts by weight |
|---|---|
| Glycerine | 15.98 |
| Phthalic anhydride | 28.11 |
| Hydrogenated castor oil | 32.21 |
| Rosin | 25.70 |

4. A flexible laminated material comprising a dense, non-fibrous, transparent sheet, an intermediate film, and securely joined thereto a substantial layer of a rubber composition containing sufficient filler to render the composition tacky but not sticky, the tackiness of which is reduced by means of a pulverulent tack-reducing material in amount sufficient to render the composition tack free but which leaves it adhesive under moderate pressure, said intermediate film containing an ink selected from the class consisting of a drying oil varnish and nitrocellulose, and an adhesion enhancing agent selected from the group consisting of the condensation product of maleic anhydride and alpha terpinene, glycerine, and abietic acid; hydrogenated castor oil modified alkyd resin containing rosin; and a rosin stearic acid mixture.

5. The product of claim 1 in which the non-fibrous base has a film of ink containing nitrocellulose on the face next to and in addition to an intermediate film of alkyd resin.

6. Product of claim 1 in which the non-fibrous base has a film of drying oil ink on the face next to and in addition to the intermediate film containing the alkyd resin.

ALBERT HERSHBERGER.